United States Patent [19]

Siegmund

[11] 4,296,207

[45] Oct. 20, 1981

[54] ANTIFREEZE PROTECTION OF ROADS

[75] Inventor: Werner Siegmund, Mannheim, Fed. Rep. of Germany

[73] Assignee: Mannesmann Aktiengesellschaft, Duesseldorf, Fed. Rep. of Germany

[21] Appl. No.: 156,747

[22] Filed: Jun. 5, 1980

[30] Foreign Application Priority Data

Jun. 11, 1979 [DE] Fed. Rep. of Germany ....... 2923939
Oct. 24, 1979 [DE] Fed. Rep. of Germany ....... 2943447
Nov. 16, 1979 [DE] Fed. Rep. of Germany ....... 2946823

[51] Int. Cl.³ ............................................. C08G 18/14
[52] U.S. Cl. ........................................ 521/53; 106/13; 106/122; 106/DIG. 7; 260/28 R; 404/17; 404/19; 404/20; 521/55
[58] Field of Search ...................... 521/53, 55; 106/13, 106/122, DIG. 7; 260/28; 404/17, 19, 20

[56] References Cited

U.S. PATENT DOCUMENTS

| | | | |
|---|---|---|---|
| 3,909,474 | 9/1975 | Borchert et al. | 404/19 |
| 4,012,537 | 3/1977 | Dubois | 404/19 |
| 4,094,686 | 6/1978 | Dubois | 404/19 |
| 4,094,805 | 6/1978 | Hansen | 106/13 |
| 4,148,938 | 4/1979 | Hansen | 106/13 |
| 4,174,912 | 11/1979 | Peterson | 404/17 |

*Primary Examiner*—Maurice J. Welsh
*Attorney, Agent, or Firm*—Smyth, Pavitt, Siegemund & Martella

[57] ABSTRACT

Residue from dressing bauxite is mixed with NaCl and ground; polyurethane foam is ground and mixed with $CaCl_2$; a silicon organic compound and quartz powder is added to one or both of the ground mixtures; the grains are embedded in bituminous material or asphalt to be used for making a surface road, being protected against frost by these salts. Specific examples and method steps are described.

15 Claims, No Drawings

ANTIFREEZE PROTECTION OF ROADS

BACKGROUND OF THE INVENTION

The present invention relates to an antifreeze admixture for the surface layer of roads.

The German printed patent application No. 25 12 691 discloses a surface layer for a road, incorporating particles which are hollow, and the hollow space is filled with an antifreeze material as, for example, NaCl. Gradual abrasion of the road at its surface liberates this additive and lowers the melting point for any surface water to, thereby, impede the icing-over of the road.

The German printed patent application No. 24 26 200 proposes to embed into the road layer-clad particles of the antifreeze material. That material is a blend of $CaCl_2$ and NaOH particles. The ratio of the component particles in the blend depends upon the climate conditions.

SUMMARY OF THE INVENTION

It is an object of the present invention to provide a new and improved antifreeze admixture for the surface layer of roads.

It is a particular object of the present invention to provide such an antifreeze admixture for use in roads having a bituminously based surface layer.

It is another object of the present invention to provide a new method of providing antifreeze protection to a road material.

In accordance with the preferred embodiment of the present invention, it is suggested to use two components, a primary one and a secondary one as carriers for antifreeze substances. The primary component is a granular or powdery material of an inorganic substance whose grains are porous, at a pore volume of at least 30 degrees. These pores contain a first antifreeze substance. Preferably, the inorganic material is a residue from bauxite processing and dressing, and the antifreeze substance is NaCl. The secondary component is a powdery or granular organic material, preferably ground polyurethane foam, with porous grains, the pore volume of a grain being also at least 30 degrees. These pores contain a second, preferably different, antifreeze substance, preferably $CaCl_2$. The components (first-to-second) are preferably used at a weight ratio of 10:0.3 to 10:3; the first component is finer than the second one. The grain size of the first component is preferably below 0.1 mm, the grain size of the second component is preferably below 1.0 mm.

At least one of the components, possibly both, are rendered hydrophobic through the addition of silicon-organic compounds; and the first component is rendered more fluid by adding higher hydrocarbons, such as Diesel oil, for instance. The two components are added to the surface layer material for the road, i.e., bituminous material or asphalt, serving in this regard as a binder.

DETAILED DESCRIPTION OF THE PREFERRED EMBODIMENTS

Method of Production

In the following, it will be described how these components for the surface layer are being produced.

Upon processing and dressing bauxite, a filter cake is produced as a residue which has the consistency of red mud, with a water content of about 50 percent. This residue is used as raw material for the primary component. Conceivably, the mud was dried, in which case it is ground and must be mixed again with water. In either case, this particular material is a finely dispersed mixture of minerals, such as oxides of aluminum as well as titanium and sodium aluminum silicate. This inorganic base material (slurry) is mixed with sodium-chloride. Particularly, sodium chloride is added in small doses and steps; and during the last phases of this adding step, one adds a silicon-organic compound, preferably also as a watery solution. The silicon-organic compound is provided in order to render this component hydrophobic. One may use here a usual, stucco-facade-type, impregnating material, such as a solution of $SiO_2.Na_2O$ in $C_2H_{55}OH$. Pulverized quartz may also be added; but if it is used at all, it should be added prior to the first salt-adding step. This additive enhances the effect of the hydrophobic additive.

The salty slurry made from the red mud is now dried, ground, and sprayed on with Diesel oil. However, one could dip the caked and dried blend into Diesel Oil, and let the excess oil drip off, whereupon the cake is ground to obtain the powder whose particles and grains are highly porous, the pores being filled with salt. The particles size should be below 0.1 mm. The Diesel oil ensures sufficient fluidity of the granular material for facilitating further handling.

As far as the secondary or supplemental component is concerned, it is separately made by providing pulverized polyurethane foam and blending the powder with calcium chloride water and also with such a silicon organic compound. The calcium chloride will lodge in the foam cells. The blend is dried and the resulting cake is ground. The particle size should be below 1.0 mm. Higher hydrocarbons such as Diesel oil is not needed.

The primary and secondary additives are now jointly, or individually, added to the bituminous base or asphalt, to be used as the surface layer for a road. Thus, the primary and secondary admixing components do not have to be mixed with each other prior to feeding them to the road surface material. It is of importance only that the two components have both been uniformly mixed with that road material and have become embedded therein. Depending upon the location of the road, and environmental conditions (such as climate) for the road, one will add 0.3 to 3 parts of secondary additive per 10 parts of primary additive.

Resulting Product

The chosen grain sizes permit utilization of the additives as supplemental fillers. Such fillers are used generally in bituminous road covers. Generally speaking, a filler serves for filling cavities and voids between the particles of the main component, such as fine basalt gravel, etc. Moreover, a filler controls to some extent the temperature-dependent ductility and toughness of the surface layer of the load, not only after having been laid, but also during preparation. The inventive antifreeze takes over all or some of these functions of a regular filler. Tests have shown that the strength of the road surface material does not suffer by utilizing this kind of admixture. Thus, as stated, the secondary additive or component may well be coarser than the primary component because the final blending tends to reduce the grain size of the secondary component. Moreover, the final blend is processed at an elevated temperature in order to maintain the bituminous material, asphalt, tar asphalt, or mineral pitch in a liquid state. These temperatures tend to coke the organic component in the secondary component so that the calcium chloride is embedded in a coke lattice and bonds intimately to the surrounding bituminous material. This way, diffusion of moisture to the calcium-chloride-containing granules is impeded. It is, thus, not necessary to protect the calcium chloride any further against premature exposure to the environment. A sufficient quantity of calcium chloride particles will always be present, close to the surface of the road top, so that the hydroscopic properties are utilized, and it will continue to lower the effective melting point, together with the sodium chloride particles. As the road top wears down, the individual grains and particles of the primary component are gradually released and serve as a mechanically acting agent, supplementing, or even replacing, the sand.

Still, as far as the grain sizes are concerned, the utilization of polyurethane powder is of advantage in respect to processing the mortar in the top part. The top layer is very hard and will remain so; but it is less brittle.

As was mentioned earlier, of particular advantage for the product is the utilization of residue from bauxite processing. The so-called red mud is actually a waste product. German Pat. No. 1,805,829 describes a specific method for treating this kind of waste material in order to use it as a filler for road construction. German printed patent application No. 23,06,145 proposes a particular drying method in order to ensure a certain degree of fluidity of this material which is, generally, very dusty. Spraying it with water does not help, because the large, related pore volume and its high content of water-soluble alkali soaks the water up and actually renders the powder less fluid; it is more difficult to meter. Also, too much water may seep into the road material itself, and one needs too much bituminous substance in order to offset this effect.

The use of bauxite residue in the admixture as per the present invention retains the advantages thereof as far as its use as a filler material in the road top is concerned; but the pores, cells, and voids of this red mud are filled with salt. Furthermore, the added silicon-organic additive renders the particles hydrophobic; it repels the water. Moreover, the adding of higher hydrocarbons ensures better fluidity and suppresses the tendency of dust development. Embedding salt into the grains of the bauxite residue increases the bulk weight of the regular red mud filler, and that feature facilitates processing and working.

A preferred primary component uses (all parts by weight) 10 parts of bauxite residue (red mud filter cake), one part of quartz powder, 30 parts NaCl, one-half part silicon-organic compounds, and one part Diesel oil. It can be seen that the salt content is surprisingly high. This is the result of the large pore volume in the bauxite residue; the porous particles were filled with salt as much as possible, whereby the presence of the silicon-organic compounds produce a surprisingly large degree of such filling and embedding of the salt.

As far as the secondary component is concerned, one uses polyurethane foam powder and a larger amount of $CaCl_2$ and water. A ratio of approximately 60:1 between $CaCl_2$ and the silicon-organic compounds can also be observed. One does not need Diesel oil, but should use also quartz powder, at a rate of twice the amount of the silicon-organic compound, for the same purpose as in the primary compound.

The following is another example for making approximately one kilogram of primary component material. An amount of 200 gram dry bauxite residue is mixed with the same amount of water to produce a red-mud slurry. Added thereto are 600 gram of fine-grained NaCl and 40 grams of a silicon-organic compound, rendering the mixture hydrophobic, such as $C_2H_5OH$ containing 90 mol parts $SiO_2$ to 1 mol part $Na_2O$. An amount of 60 quartz of powder is added thereto, following which 40 grams of another silicon-organic compound is being added, such as $C_2H_5OH$ containing 60 mol parts $SiO_2$ to 1 mol part $Na_2O$. The two silicon compounds are of the type being used for impregnating stucco facades. The alcoholic solution of the first-mentioned compound has had a pH value of approximately 12.4 and a density of 1.1 $g/cm^3$, the second silicon compound has had a density of 1.17 $g/cm^3$ and a pH value of 11.8. The solid content of the alcoholic solutions for these silicon compounds was in excess of 20 degrees. Finally, an amount of approximately 100 gram Diesel oil was used.

The invention is not limited to the embodiments described above; but all changes and modifications thereof, not constituting departures from the spirit and scope of the invention, are intended to be included.

I claim:

1. An admixture for the surface layer of a road, comprising:
   a first and primary component thereof, being a granular, inorganic material, grains thereof being porous, in which the pore volume is at least 30 degrees, the pores containing a first antifreeze substance;
   a second and secondary component, being a granular, organic materal, the grains thereof also being porous and having a pore volume in excess of 30 degrees, the pores containing a second antifreeze substance;
   at least one of the components being made hydrophobic through the addition of a silicon-organic compound; and
   the grains of said first and second component being embedded in a bituminous, or asphalt, binder.

2. An admixture as in claim 1, said first antifreeze material being sodium chloride.

3. An admixture as in claim 1, said second antifreeze material being calcium chloride.

4. An admixture as in claim 1, wherein the grain size of the first component is below 0.1 mm and the grain size of the second component is below 1.0 mm.

5. An admixture as in claim 1, 3, or 4, the second component being ground polyurethane foam.

6. An admixture as in claim 1, 2, or 4, the first component being bauxite-processing residue, including a finely dispersed mineral blend of sodium aluminum silicate, aluminimum oxide and titanium oxide.

7. An admixture as in claim 1 or 2, further including higher hydrocarbons.

8. An admixture as in claim 7, the higher hydrocarbons being Diesel oil.

9. An admixture as in claim 1, the first component being a residue mixture that includes sodium aluminum silicate and oxides of aluminum and titanium, the second component being polyurethane foam powder.

10. An admixture as in claim 1, 4, or 9, wherein for ten parts by weight of the first component approximately 0.3 to 3.0 parts by weight of the second compound are used.

11. An admixture as in claim 10, one of the antifreeze materials being sodium chloride, the other one being calcium chloride.

12. A method of making an admixture for use as the surface layer of a road, comprising the steps of
   (1) mixing a porous inorganic substance, having a pore volume of at least 30 degrees, with water, sodium chloride, and a silicon-organic compound;
   (2) mixing a porous, organic substance, having a pore volume of at least 30 degrees, with water, calcium chloride, and a silicon-organic compound;
   (3) separately drying the substances resulting from the mixing steps;
   (4) grinding the dried substances containing the sodium chloride to a particle size below 0.1 mm;
   (5) grinding the other substance to a particle size below 1.0 mm; and
   (6) said ground substances being mixed with road surface material, the material serving as a binder.

13. A method as in claim 12, using as the inorganic substance red mud resulting from bauxite processing.

14. A method as in claim 13, in which mixing step (1) is carried out by the step-wise addition of the sodium chloride to said red mud, the silicon-organic compound being added in a last adding step.

15. A method as in claim 12, including, in at least one of the mixing steps, the step of adding 1 to 30 parts by weight quartz powder per 100 parts by weight organic or inorganic substance, prior to adding the respective silicon-organic compound and the sodium chloride, or the the calcium chloride.

* * * * *